Jan. 3, 1961     E. J. ZARYBNICKY     2,966,926
METER FLOW VALVES
Filed May 14, 1957

INVENTOR.
EDWARD J. ZARYBNICKY
BY
Bean, Brooks, Buckley & Bean.
ATTORNEYS

United States Patent Office 2,966,926
Patented Jan. 3, 1961

2,966,926

METER FLOW VALVES

Edward J. Zarybnicky, Cleveland, Ohio, assignor to The W. J. Schoenberger Company, Cleveland, Ohio Filed May 14, 1957, Ser. No. 659,049

1 Claim. (Cl. 137—599.2)

My invention relates in general to gas valves for use in connection with gas burning devices, and more particularly to a meter flow valve for supplying controlled amounts of gas to a gas burner.

It is well known that in present day devices metering adjustments of valves of this nature have necessitated the use of a screwdriver, which entails disassembling of portions of the controls of the burner to make such adjustments.

The principal object of my invention has been to provide a gas valve with a selector means independent of the valve handle for conveniently choosing any one of a number of different fuel inputs to the burner.

A further object is to provide a valve of this type which will always deliver a full fuel flow when the valve is turned to the "on" position, regardless of the position in which the selector means was left when the valve was last used.

The above objects and advantages have been accomplished by the device shown in the accompanying drawings, of which:

Figure 1:
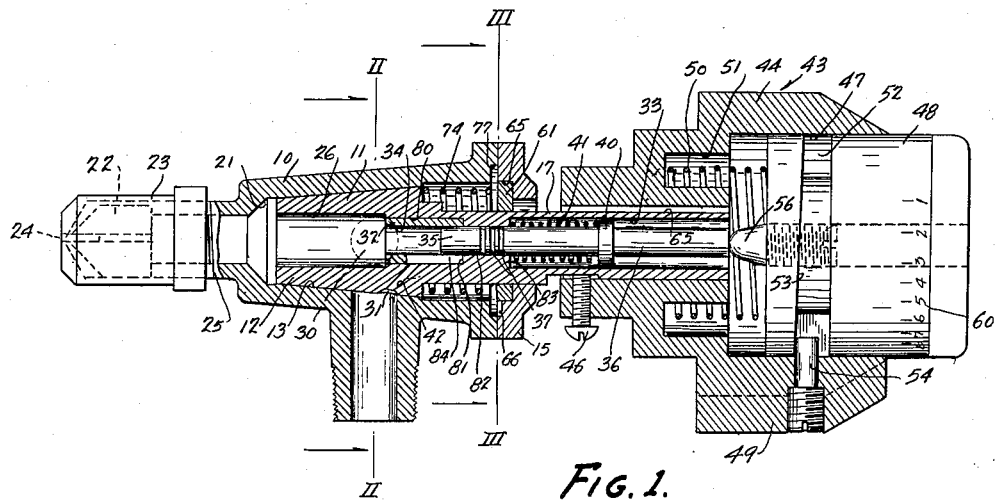
Fig. 1 is a longitudinal sectional elevation through my device showing the valve plug in its metering position.

The valve comprises a body 10 having a tapered bore 11 in which is mounted a plug 12 having a tapered periphery 13 which fits into the bore 11 in fluid sealing manner. The body is formed with a body flange 14 against the face of which a face plate 15 is secured by means of screws 16. The valve plug is formed with an outwardly extending plug stem 17.

Figure 2:
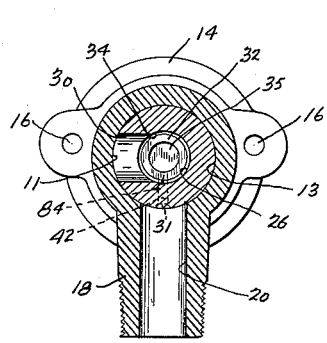
Fig. 2 is a sectional elevation taken on line II—II of Fig. 1.

The body 10 is provided with an inlet portion 18 formed with an inlet port 20 which is secured by suitable means to a source of gas supply (not shown). The body is also formed with an outlet chamber 21 in the end of which is fitted the usual needle valve 22. A hood 23, formed with an outlet port 24, is threaded over an extension 25 of the body for adjustment with respect to the needle valve. The plug 12 of my invention is designed to be actuated to three positions; namely, a full supply position, a metered supply position, and an "off" position. The valve plug 12 is, therefore, provided with a longitudinal passage 26 with which a radial passage 30 communicates. The radial passage 30 is of substantially the same diameter as the inlet port 20, whereby a full supply of gas will be supplied to the hood when this passage is in registration with the inlet port 20. In order to accomplish the metering function of the burner, I provide the plug 12 with a shallow recess 31 which is in registration with the inlet port 20 when the valve plug is in its metering position, as shown in Figs. 1 and 2. Extending outwardly from the passage 26 of the plug is a concentric passage 80 which is formed in the plug stem 17 and which is preferably smaller in diameter than the diameter of the passage 26. Within the passage 80 is mounted a valve insert 32 formed with a longitudinal passage 34. The insert is press-fitted into the passage and against a shoulder 81 formed at the base thereof by a passage 82 smaller in diameter than the diameter of the passage 80 and preferably of the same diameter as a longitudinal passage 34 of the insert. The insert is formed with a longitudinally arranged slot 84 which is formed through the wall thereof and which extends inwardly a substantial distance from the outer end thereof. A piston valve 35 is formed at the forward end of a valve stem 36 and it is slidably mounted within the longitudinal passageway 34 of the insert and within the passage 82 of the plug stem. This stem extends outwardly and is formed with a passage 33 which is larger in diameter than the diameter of the passage 82. The passage 33 extends from a shoulder 83 formed in the plug stem to the outer end of the stem. A collar 40 is fixed to the valve stem 36, and a spring is mounted within the passage 33 having one end bearing against the collar 40 and the other end bearing against the shoulder 83, whereby the valve stem will be normally urged in an outward direction.

An obliquely arranged auxiliary port 42 is formed in the plug and it extends from the recess 31 thereof to the longitudinal bore 34 of the valve insert through the slot 84, thereof. The slot of this insert is so positioned in relation to the end 35 of the piston valve that the valve may be moved axially over the slot and thus meter the amount of gas flowing from the inlet port to the hood. The piston valve is formed with a number of annular grooves 37 which aid in preventing escape of gas.

In order to accomplish the regulation of the metered gas flow through the valve by axial movement of the meter valve stem, I provide an actuating device 43 which is mounted upon the outer end of the plug stem 17. This actuating device comprises a body 44 having an axial opening 45 for mounting upon the outer end of the plug stem 17 and it is fixed against axial movement thereon by any suitable means, such as a set screw 46. The body 44 is formed with a recess 47 within which is mounted the regulating member 48 of the metering device. The member 48 is provided with a longitudinally projecting rib 49 for convenience of the operator when actuating the plug 12. The regulating member 48 is urged outwardly within the body by means of a helical spring 50 mounted within a recess 51 formed in the body. The regulating member is provided with an annular groove 52, the inner face 53 of which is inclined as shown in Fig. 1 thus forming a cam. A cam screw 54 is carried by the body 44 of the actuating device and its inner end extends into the groove 52 of the regulating member. The inclined surface 53 of the groove is pressed against the end of the screw by the spring 50, thereby producing a camming action upon the regulating member when rotated, as well as serving to hold the regulating member 48 within the body 44 of the actuating device.

Extending inwardly from the inner face 55 of the regulating member is a regulator screw 56 which bears against the outer end of the metering valve stem 36 and urges it axially against the tension of the valve spring 41. The regulating member is formed on its outer surface with a series of graduations or numerals 60 which register with a fixed line (not shown) on the body 44 of the device by which the operator may adjust the flow of gas to the burner at any desired rate. As shown in Fig. 1, the slot 84, communicating with the auxiliary port 42 through the valve plug, is in substantially full open position; and, obviously, as the regulating member is rotated in a counterclockwise direction as viewed from the right of Fig. 1, the regulator screw 56 will push the metering valve stem inwardly in proportion to the amount of rotation of the regulating member, thus regulating the gas flow through the slot. Obviously, the metered flow of gas is cut-off when the end 35 of the metering valve stem is moved inwardly so as to cover the slot of the insert. The regulation of the gas flowing through the slot is a resultant of the width and shape of the slot, the camming action of the inclined surface, and the spacing of the graduation on the regulating member. It is desirable, however, that parts be so proportioned and related that gas will be graduated uniformly in correspondence with the number of graduations on the regulating member.

Figure 4:
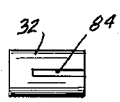
Figs. 4-6 show side views of different valve inserts formed with modified slots in the walls thereof.
Figure 5:
Figure 6:

In Fig. 4, I show one form of insert having a slot 84 formed with parallel walls. In Figs. 5 and 6 I show inserts 85 and 86 having modified slots 90 and 91, respectively. The slot 90 of insert 85 is V-shaped having sides which are substantially straight, whereas the slot 91 of insert 86, while V-shaped like that of the slot 90, has its walls curved or bowed away from each other. As hereinbefore indicated, it is desirable to have a straight flow of gas through the metering device, and in order to accomplish this, the form of the slot may take any one of the shapes shown.

Figure 3:
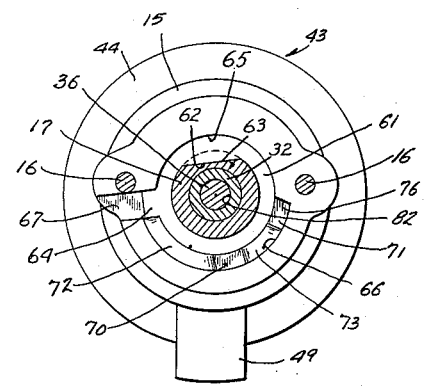
Fig. 3 is a sectional elevation taken on line III—III of Fig. 1.

In order to indicate the position of the valve plug, I provide a click washer 61. This washer is provided with a D-shaped opening 62 which is nonrotatably but slidably mounted upon the plug stem 17. This stem is provided with a flat surface 63 for the reception of the flat surface 62 of the washer, whereby the washer will rotate with the plug stem. The washer is disposed within a recess 65 formed in the face of the face plate 15, and it is provided with a detent tab 64 extending outwardly beyond the general periphery thereof. The detent tab of the washer is disposed within a concentric arcuate recess 66 formed in the face plate and movable therein when the plug stem 17 is rotated. The arcuate recess is formed with depressed grooves 67, 70 and 71, the grooves 67 and 70 being separated by an elevated portion 72 and the grooves 70 and 71 being separated by an elevated portion 73. A plug spring 74 is mounted within a counterbore 75 formed in the outer end of the valve body and this spring bears against the valve plug at one end and against the click washer at the opposite end, thereby maintaining the plug in sealing relation with the tapered bore 11 and also pressing the click washer axially in outward direction. The ends of the elevated portions 72 and 73 are rounded or inclined so as to permit the tab 64 of the washer to rise and engage the elevated surfaces when the plug stem is rotated from one position to another. It will be observed from Fig. 3 that the detent tab 64 is disposed within the groove 67. This is the position occupied by the parts when the plug stem is in its metering position. As the valve is rotated in counterclockwise direction the tab is caused to leave the groove 67 and engage the elevated surface 72, whereupon it will subsequently engage the groove 70 when moved to a position of registration therewith. When the tab is in registration with the groove 70, the valve will be in its fully open position. Further counterclockwise rotation of the valve stem and associated parts will cause the tab to become disengaged from the groove 70 and to pass over the elevated surface 73 until it reaches the groove 71, whereby it will be engaged with the shoulder 76 thereof and stop the valve plug in its "off" position. An annular relief recess 77 is formed in the face of the body flanges 14 to permit axial movement of the click washer when it is being moved from one groove to another.

From the foregoing it will be obvious that my device is provided with valve control means for moving the valve plug to fully open and closed positions as well as separate and independent means for accurately and sensitively regulating a restricted or metered flow of gas fuel to the burner. Furthermore, when once the desired adjustment through the metering device has been arrived at, the valve may be repeatedly set at the same rate of flow. Moreover, it is clear that when once the flow of gas through the auxiliary port 42 and slot 84 has been regulated, the valve plug may be actuated to either closed position or fully open position without disturbing the adjustment of the metering device, thus permitting the same rate of flow of gas when the metering device is again used without further adjustment.

While I have shown a sliding valve arrangement for metering the supply of gas through the auxiliary port, it is obvious that any other suitable type of valve may be employed. Furthermore, while I have shown the annular groove 52 of the regulating member as having a cam face on one surface only and a helical spring to urge this surface against the cam screw, the groove 52 may be helically formed so as to substantially contact the screw on both faces, in which case the helical spring could be omitted. These and other modifications of the details herein shown and described may be made without departing from the spirit of the invention or the scope of the appended claim.

What is claimed is:

A gas valve comprising a body having a tapered bore, said body being formed with an inlet port and with an axial outlet bore opening into said tapered bore, a flow control member comprising a tapered plug mounted within the tapered bore and rotatable to on and off positions of said valve, said plug being provided with an outwardly extending integral stem, said plug and said stem being formed with an axial passage extending the full length thereof, said plug being formed with a radial supply port and with an auxiliary port each separately registerable with said inlet port, a valve insert mounted within the axial passage of said plug and stem and formed with a longitudinal bore, said insert being formed with a slot extending through its wall into said bore, said slot being in communication with said auxiliary port, a metering plunger slidably mounted within the longitudinal bore of said valve insert to regulate the open length of said slot, said metering plunger being spring-loaded and biased toward slot maximum open position and movable in said insert to control the amount of gas flow through the slot of said insert, manual valve control means carried by said plug stem, comprising a hollow control handle keyed to said stem for rotating the latter between on and off positions, said control handle having a main and an auxiliary recess formed therein, an operably separate adjusting device carried by said control handle, the inner end of said adjusting device being rotatably mounted in said main recess, metering plunger engaging means secured to said inner end of said adjusting device and in abutting relationship with the outer end of said spring loaded metering plunger, a circumferential groove formed in said adjusting device, said groove having an inner and an outer wall face, the inner face of said groove being inclined so as to form a cam surface and cam surface engaging means threadably secured to the inner face of said control handle and extending into said main recess and engaging said cam groove in said adjusting device to maintain said adjusting device in operative position within said control handle, spring means mounted within said auxiliary recess in said handle and engaging said inner end of said operating device whereby the main and auxiliary port adjustments are simultaneously available and readily accessible for manual operation without disassembly.

References Cited in the file of this patent
UNITED STATES PATENTS

| | | |
|---|---|---|
| 1,506,434 | Leins | Aug. 26, 1924 |
| 1,596,043 | Hume | Aug. 17, 1926 |
| 1,621,738 | Motherwell | Mar. 22, 1927 |
| 1,697,953 | French | Jan. 8, 1929 |
| 2,167,433 | Duffield | July 25, 1939 |
| 2,224,566 | Jaros | Dec. 10, 1940 |
| 2,262,703 | Stuckenholt | Nov. 11, 1941 |
| 2,322,518 | Huber | June 22, 1943 |
| 2,625,909 | Steely | Jan. 20, 1953 |
| 2,650,613 | Brumbaugh | Sept. 1, 1953 |

FOREIGN PATENTS

| | | |
|---|---|---|
| 362,039 | Great Britain | Dec. 3, 1931 |
| 678,980 | Great Britain | Sept. 10, 1952 |